United States Patent
Sen et al.

(10) Patent No.: US 10,789,247 B2
(45) Date of Patent: Sep. 29, 2020

(54) TUNE RESOURCE SETTING LEVELS FOR QUERY EXECUTION

(71) Applicant: Microsoft Technology Licensing, LLC, Redmond, WA (US)

(72) Inventors: Rathijit Sen, Madison, WI (US); Karthik S. Ramachandra, Madison, WI (US); Alan D. Halverson, Verona, WI (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 239 days.

(21) Appl. No.: 15/986,493

(22) Filed: May 22, 2018

(65) Prior Publication Data
US 2019/0362005 A1    Nov. 28, 2019

(51) Int. Cl.
G06F 16/00      (2019.01)
G06F 16/2453    (2019.01)
G06F 9/50       (2006.01)

(52) U.S. Cl.
CPC ........ *G06F 16/24532* (2019.01); *G06F 9/505* (2013.01); *G06F 9/5027* (2013.01); *G06F 9/5011* (2013.01)

(58) Field of Classification Search
CPC .. G06F 16/24532; G06F 9/505; G06F 9/5027; G06F 9/5011
See application file for complete search history.

(56) References Cited

U.S. PATENT DOCUMENTS

| | | |
|---|---|---|
| 7,890,457 B2 | 2/2011 | Dias et al. |
| 8,005,809 B2 | 8/2011 | Buckler |
| 8,065,682 B2 | 11/2011 | Baryshnikov et al. |
| 8,099,399 B2 | 1/2012 | Wilkinson et al. |
| 8,200,659 B2 | 6/2012 | Zibitsker |
| 8,583,756 B2 | 11/2013 | Ng et al. |

(Continued)

OTHER PUBLICATIONS

"Managing Microsoft SQL Server Workloads by Service Levels on EMC VMAX3", Retrieved From https://www.emc.com/collateral/technical-documentation/h13826-microsoft-sql-vmax3-sg.pdf, Apr. 2015, 59 Pages.

(Continued)

*Primary Examiner* — Alexander Khong
(74) *Attorney, Agent, or Firm* — Mannava & Kang, P.C.

(57) ABSTRACT

According to examples, an apparatus may include a machine readable medium on which is stored machine readable instructions that may cause a processor to, for each of a plurality of resource setting levels, determine resource usage characteristics and execution times of executed workloads, assign, based on the resource usage characteristics of the executed workloads, each of the executed workloads into one of a plurality of resource bins, determine, for each of the resource bins, an average execution time of the executed workloads in the resource bin, determine a total average execution time of the executed workloads from the determined average execution times, identify a lowest total average execution time of the determined total average execution times, determine the resource setting level corresponding to the identified lowest total average execution time, and tune a resource setting to the determined resource setting level.

20 Claims, 5 Drawing Sheets

(56) References Cited

U.S. PATENT DOCUMENTS

| | | | |
|---|---|---|---|
| 2006/0026179 A1 | 2/2006 | Brown et al. | |
| 2008/0154837 A1* | 6/2008 | Morimura | G06F 11/3419 706/48 |
| 2010/0095299 A1* | 4/2010 | Gupta | G06F 9/4881 718/103 |
| 2011/0022870 A1* | 1/2011 | McGrane | G06F 1/3203 713/340 |
| 2011/0093852 A1* | 4/2011 | Li | G06F 9/5066 718/100 |
| 2012/0173477 A1 | 7/2012 | Coutts et al. | |
| 2013/0024442 A1* | 1/2013 | Santosuosso | G06F 16/245 707/720 |
| 2014/0297833 A1* | 10/2014 | Bedini | H04L 43/0876 709/224 |
| 2016/0328273 A1* | 11/2016 | Molka | G06F 9/505 |
| 2017/0017685 A1* | 1/2017 | Das | G06F 16/10 |
| 2018/0246766 A1* | 8/2018 | Holmberg | G06F 9/5038 |
| 2019/0116237 A1* | 4/2019 | Gibson | H04L 67/2833 |

OTHER PUBLICATIONS

"Solution: Testing database environment changes with realistic database workloads", Retrieved From https://www.ibm.com/support/knowledgecenter/en/SS2S7B_2.1.0/com.ibm.datatools.capturereplay.overview.doc/topics/cr_solution_overview.html, Retrieved on: Mar. 12, 2018, 3 Pages.

Aken, et al., "Automatic database management system tuning through large-scale machine learning", In Proceedings of ACM International Conference on Management of Data, May 14, 2017, pp. 1009-1024.

Chaudhuri, et al., "An Efficient, Cost-Driven Index Selection Tool for Microsoft SQL Server", In Proceedings of 23rd International Conference on Very Large Data Bases, Aug. 25, 1997, pp. 146-155.

Chaudhuri, et al., "Self-tuning database systems: A decade of progress", In Proceedings of 33rd International Conference on Very Large Data Bases, Sep. 23, 2007, pp. 3-14.

Delaney, et al., "Microsoft SQL Server 2012 Internals", In Publication of Microsoft Press, Nov. 26, 2013, 983 Pages.

Pavlo, et al., "Self-driving database management systems", In Proceedings of 8th Biennial Conference on Innovative Data Systems Research, Jan. 8, 2017, 6 Pages.

Roth, et al., "SQL Server on Linux", Retrieved From https://docs.microsoft.com/en-us/sql/linux/sql-server-linux-overview, Feb. 22, 2018, 3 Pages.

Sen, et al., "Characterizing resource sensitivity of database workloads", In Proceedings of 24th IEEE International Symposium on High Performance Computer Architecture, Feb. 2018, 13 Pages.

"International Search Report and Written Opinion Issued in PCT Application No. PCT/US2019/030981", dated Jul. 15, 2019, 15 Pages.

* cited by examiner

TUNE RESOURCE SETTING LEVELS FOR QUERY EXECUTION

BACKGROUND

A database may refer to a collection of data and/or data structures stored in a digital form. Databases and database systems have continued to evolve over the years such that some databases may support several users simultaneously and may execute concurrent query streams. A Database Management System (DBMS) may be provided to manage such databases and database systems.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
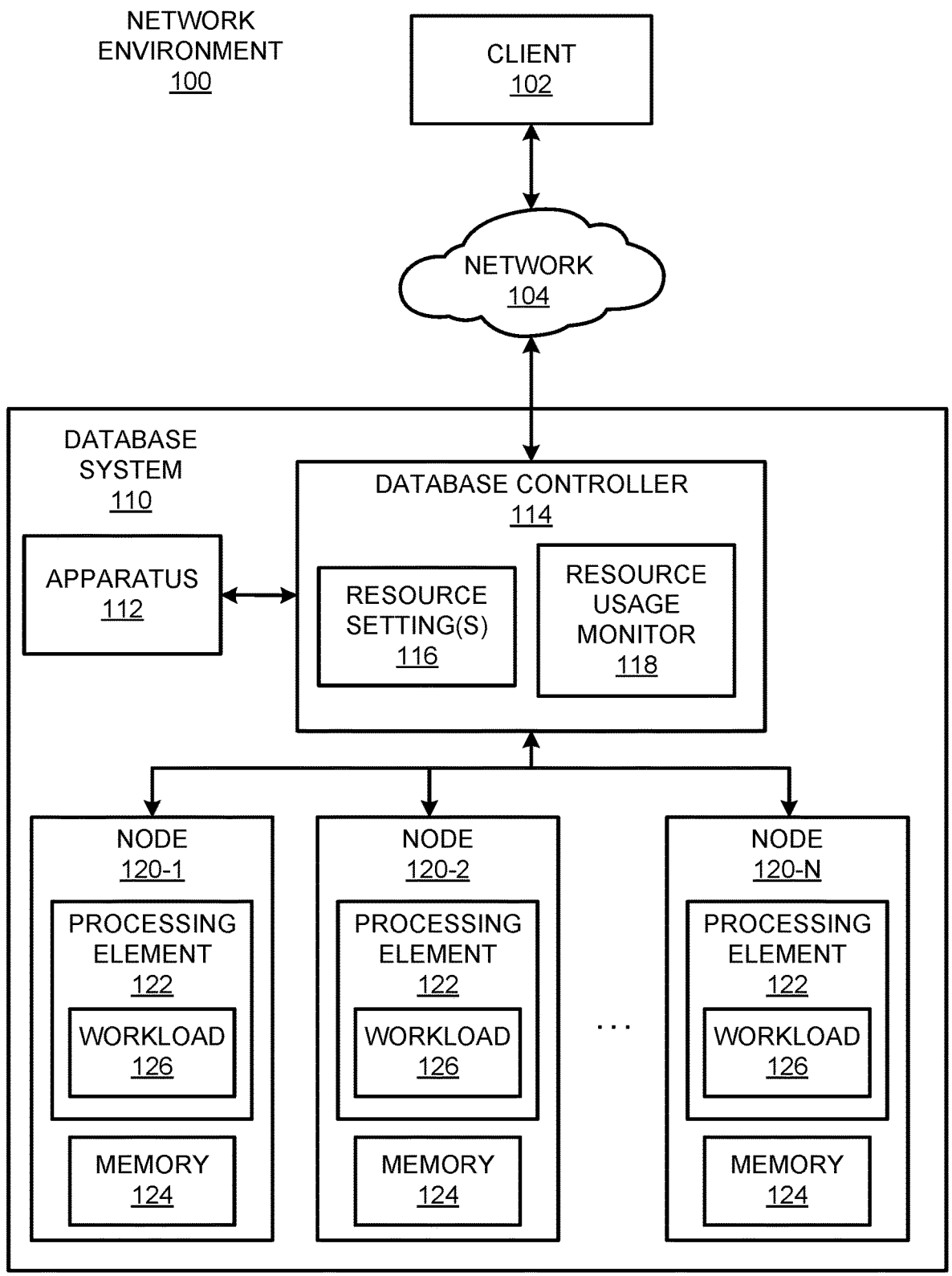
FIG. 1 depicts a block diagram of a network environment in which an apparatus may be implemented to tune resource setting levels applicable to the execution of workloads in accordance with an embodiment of the present disclosure.

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

Database systems may expose several resource setting levels (knobs) for users to control, in which the resource setting levels may be applied in processing queries. Applying different resource setting levels may result in different performance levels in the processing of the queries, such as different execution times. As a result, applying suboptimal resource setting levels may lead to performance loss, e.g., queries being processed inefficiently.

Disclosed herein are apparatuses, methods, and machine readable mediums that determine resource setting levels that may improve performance levels of database systems. For instance, resource setting levels that minimize execution times of a plurality of queries (which is equivalently referenced herein as workloads) may be determined. Particularly, as disclosed herein, a processor may determine resource usage characteristics of queries and execution times of the queries resulting from a first resource setting level. The processor may also assign each of the executed queries into one of a plurality of resource bins, in which the resource bins may each define a different range of resource usage characteristics. The processor may further determine, for each of the resource bins, an average execution time of the executed queries in the resource bin. In addition, the processor may determine a total average execution time of the executed queries from the determined average execution times resulting from the first resource setting level.

The processor may change the resource setting to multiple resource setting levels and for each of the multiple resource setting levels, may repeat the above-cited process to determine total average execution times respectively resulting from the multiple resource setting levels. In some examples, the processor may determine the total average execution times sequentially, e.g., may determine the total average execution times corresponding to a resource setting level prior to moving onto another resource setting level. In other examples, the processor may implement an interleaved exploration operation in which a resource setting level is selected and execution times corresponding to the selected resource setting level are observed, another resource setting level is selected and execution times corresponding to the other resource setting level are observed, and so forth. When sufficient samples are available for each resource setting level, e.g., when at least one query is found in each resource bin for the resource setting level, the processor may compute and/or update the determination of the total average execution time for the resource setting level. In addition, or in other examples, such as in instances in which the database is replicated and different resource setting levels are simultaneously applied to the different replicas, the processor may implement a parallel exploration operation in which the processor may simultaneously determine the total average execution times corresponding to multiple resource setting levels.

In any of the examples discussed herein, the processor may further determine the resource setting level corresponding to a lowest total average execution time of the determined total average execution times. The processor may still further tune the resource setting level to the determined resource setting level such that future queries may be executed under that resource setting level. In other words, the processor may tune a resource setting to the determined resource setting level in an execution of another, e.g., future, workload.

According to examples, the processor may apply weights to the average execution times and may determine the total average execution time resulting from a resource setting level as a total weighted average execution time. In addition or in other examples, the processor may determine respective resource setting levels corresponding to the lowest total (weighted) average execution times for multiple query groups. In addition, or in still other examples, the processor may identify query groups for which queries may be optimized, e.g., the queries may be partitioned into query groups such that the execution times of the queries may be minimized through application of particular resource setting levels.

As discussed above, less than optimal resource setting levels may result in significant performance loss. Through implementation of the apparatuses, methods, and machine readable instructions disclosed herein, a processor may determine resource setting levels that result in minimal execution times for queries in a relatively quick and efficient manner. In addition, a technical improvement of the present disclosure is that a processor may determine and tune the resource setting to a level that causes nodes to execute the queries in an efficient manner through minimization or close to minimization of the execution times of the queries. In one regard, as the nodes may operate efficiently in executing the queries, the nodes consume reduced or minimized amounts of power in executing the queries and may execute a larger number of queries over a time period. Likewise, as the processor may efficiently determine the resource setting level that causes the nodes to execute the queries in an efficient manner, the processor consumes reduced or minimized amounts of power in the determination of the resource setting level.

With reference first to FIG. 1, there is shown a block diagram of a network environment 100 in which an apparatus 112 may be implemented to tune resource setting levels applicable to the execution of workloads in accordance with an embodiment of the present disclosure. It should be understood that the network environment 100 depicted in FIG. 1 may include additional features and that some of the features described herein may be removed and/or modified without departing from the scope of the network environment 100.

As shown, in the network environment 100, a client 102 may access a database system 110 via a network 104, which may be the Internet, a local area network, or the like. The client 102 may access the database system 110 to, for instance, submit a workload, which may also equivalently be termed a query, into the database system 110 and to receive responses to the submitted workload. By way of example, the client 102 may submit a workload to retrieve particular data, write data to the database system 110, modify data stored in the database system 110, gain access to a particular application, and/or the like.

The database system 110 may include an apparatus 112, a database controller 114, and a plurality of nodes 120-1 to 120-N, in which the variable "N" may represent a value greater than one. The nodes 120-1 to 120-N may be machines, e.g., servers, storage devices, CPUs, or the like, and may include respective processing elements 122 and memories 124. In addition, the processing elements 122 and the memories 124 may function to execute respective workloads 126, e.g., queries 126.

The processing elements 122 may be semiconductor-based microprocessors, central processing units (CPUs), application specific integrated circuits (ASICs), field-programmable gate arrays (FPGAs), and/or other hardware devices. The memories 124 may be, for example, Random Access memories (RAMs), Electrically Erasable Programmable Read-Only Memories (EEPROMs), storage devices, optical discs, and/or the like. Although each of the nodes 120-1 to 120-N has been depicted as including a single processing element 122 and a single memory 124, the nodes 120-1 to 120-N may include multiple processing elements 122 and/or multiple memories 124 without departing from a scope of the database system 110.

The database controller 114, which may be a computing device, a node, a semiconductor-based microprocessor, a central processing unit (CPU), an application specific integrated circuit (ASIC), a field-programmable gate array (FPGA), and/or other hardware device, may manage the nodes 120-1 to 120-N. For instance, the database controller 114 may manage deployment of workloads 126 onto the nodes 120-1 to 120-N. In addition, the database controller 114 may manage resource settings 116 of the nodes 120-1 to 120-N, in which the resource settings 116 may affect the execution times of the workloads 126. The resource settings 116 may include, for instance, a maximum memory limit, which may be defined as the maximum amount of memory that a single workload 126 (query) may be granted for its execution. The resource settings 116 may also include a maximum degree of parallelism, which may be defined as the maximum number of threads that a single workload 126 (query) may use at any time. The resource settings 116 may further include a cost threshold for when a workload 126 is to be executed using multiple threads, e.g., a cost threshold for parallelism.

Generally speaking, increasing the maximum memory limit may improve individual workload performance but may reduce the number of workloads that execute concurrently, and vice versa. In addition, increasing the maximum degree of parallelism may increase performance of individual workloads but may reduce performance of concurrent workloads by reducing the number of available processing element 122 (e.g., core) cycles, and vice versa. Moreover, setting the cost threshold for when a workload 126 is to be executed using multiple threads to a higher level may reduce the workloads 126 that are considered for execution using multiple threads.

The database controller 114 may also include a resource usage monitor 118 that may monitor resource usage characteristics of the workloads 126 as well as execution times of the workloads 126. The execution time of a workload 126 may be a total time for the workload 126 to be executed, which may include a wait time for resource grants. The resource usage monitor 118 may be a hardware device integrated with and/or in communication with the database controller 114 and/or machine readable instructions stored in the database controller 114.

The resource usage characteristics may pertain to an amount of resources that the nodes 120-1 to 120-N may consume in executing the workloads 126. By way of particular example, the resource usage characteristics may include ideal memory sizes for execution of the workloads 126, in which the ideal memory size for execution of a workload may be an estimate (e.g., made by a SQL server) of the maximum amount of memory needed to fit all of the workload 126 data requirements in memory 124. For instance, the resource usage monitor 118 may determine the ideal memory sizes for execution of the workloads 126 based on cardinality estimates. In addition or in other examples, the resource usage characteristics may include characteristics of the query itself, such as type of operations (e.g., scans, merges, joins, or the like, in the query), shape of the query plan, etc.

The apparatus 112 may tune the resource setting levels 116 to, for instance, enable the nodes 120-1 to 120-N to concurrently execute the workloads 126 in a minimum amount of time. For instance, the apparatus 112 may communicate with the database controller 114 to identify the resource usage characteristics resulting from multiple resource setting levels. In addition, the apparatus 112 may determine the resource setting level that corresponds to a lowest total average execution time as discussed herein. Although the apparatus 112 has been depicted as being separate from the database controller 114, it should be understood that the apparatus 112 and the database controller 114 may be a single component without departing from a scope of the database system 110 disclosed herein. In addition or in other examples, the apparatus 112 and/or the database controller 114 may be one of the nodes 120-1 to 120-N.

Figure 2:
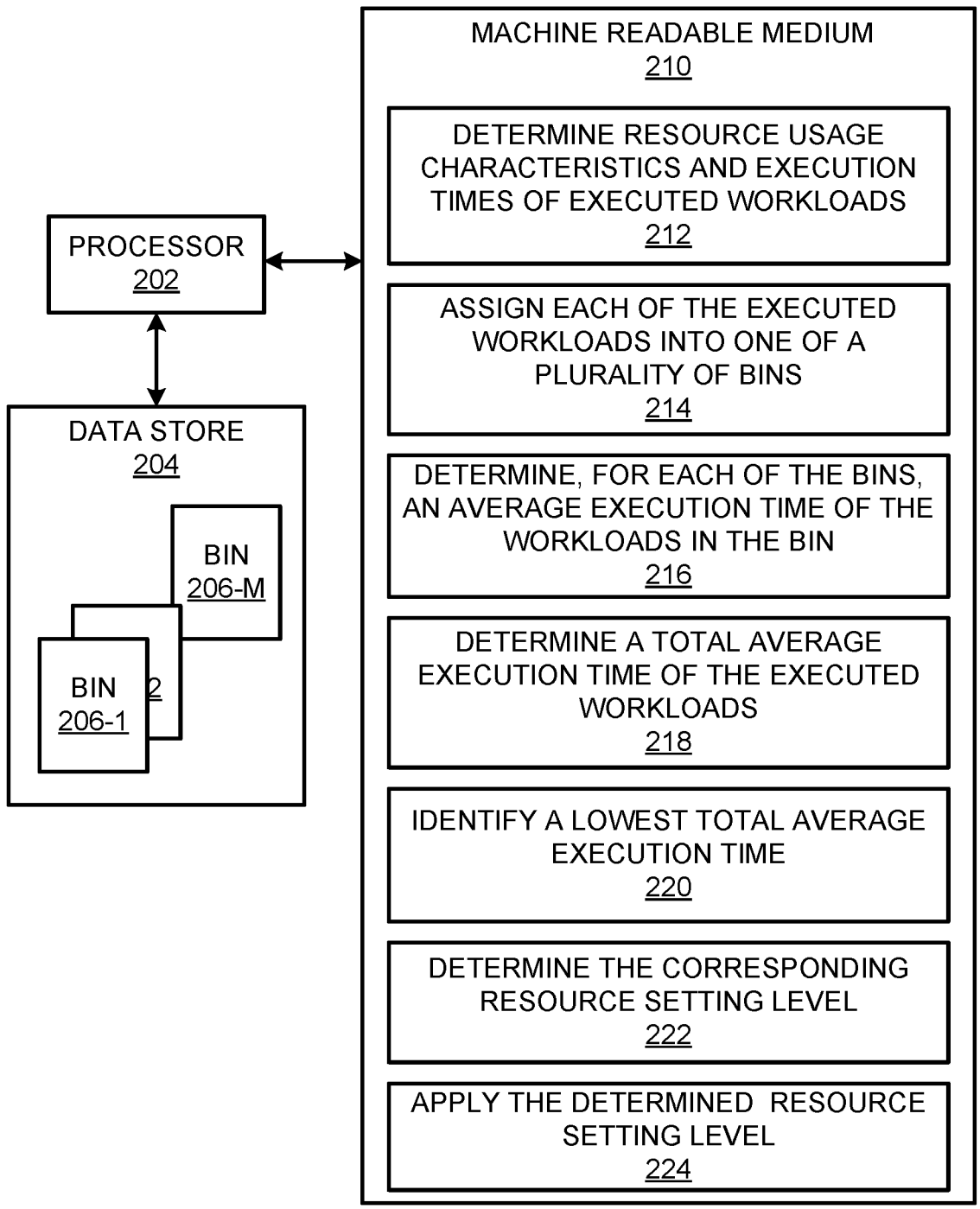
FIG. 2 depicts a block diagram of an apparatus that may tune resource setting levels applicable to the execution of workloads in accordance with an embodiment of the present disclosure.

Turning now to FIG. 2, there is shown a block diagram of an apparatus 200 that may tune resource setting levels applicable to the execution of workloads 126 in accordance with an embodiment of the present invention. It should be understood that the apparatus 200 depicted in FIG. 2 may include additional features and that some of the features described herein may be removed and/or modified without departing from the scope of the apparatus 200.

Generally speaking, the apparatus 200 may be equivalent to the apparatus 112 depicted in FIG. 1. The description of the apparatus 200 is thus made with reference to the features depicted in FIG. 1. As shown, the apparatus 200 may include a processor 202 and a machine readable medium 210. The processor 202 may be a semiconductor-based microprocessor, a central processing unit (CPU), an application specific integrated circuit (ASIC), a field-programmable gate array (FPGA), and/or other hardware device. Although the apparatus 200 is depicted as having a single processor 202, it should be understood that the apparatus 200 may include additional processors and/or cores without departing from a scope of the apparatus 200. In this regard, references to a single processor 202 as well as to a single machine readable medium 210 may be understood to additionally or alternatively pertain to multiple processors 202 and multiple machine readable mediums 210.

The machine readable medium 210 may be, for example, Random Access memory (RAM), an Electrically Erasable Programmable Read-Only Memory (EEPROM), a storage device, an optical disc, or the like. The machine readable medium 210, which may also be referred to as a computer readable storage medium, may be a non-transitory machine-readable storage medium, where the term "non-transitory" does not encompass transitory propagating signals. In any regard, the machine readable medium 210 may have stored thereon machine readable instructions 212-224.

The processor 202 may fetch, decode, and execute the instructions 212 to determine resource usage characteristics and execution times of executed workloads 126 for a first resource setting level. That is, for instance, the processor 202 may instruct the database controller 114 to set the resource setting 116 to the first setting level and the resource usage monitor 118 may track the resource usage characteristics and the execution times of the executed workloads 126 resulting from the first setting level. In addition, the processor 202 may retrieve and/or receive the resource usage characteristics and the execution times of the executed workloads 126 from the database controller 114.

The processor 202 may fetch, decode, and execute the instructions 214 to assign, based on the resource usage characteristics of the executed workloads 126, each of the executed workloads 126 into one of a plurality of resource bins 206-1 to 206-M, in which the variable "M" may represent a value greater than one. According to examples, the resource bins 206-1 to 206-M may be virtual resource bins and the processor 202 may store the assignments of the executed workloads 126 to the resource bins 206-1 to 206-M in a data store 204. In addition, each of the resource bins 206-1 to 206-M may define a different range of resource usage characteristics. Thus, for instance, the processor 202 may assign a first executed workload 126 having a first resource usage characteristic level into the resource bin 206-1 that defines a range that includes the first resource usage characteristic level. Likewise, the processor 202 may assign a second executed workload 126 having a second resource usage characteristic level into the resource bin 206-2 that defines a range that includes the second resource usage characteristic level.

By way of particular example, the resource usage characteristic may be ideal memory sizes for execution of the workloads 126 and the resource bins 206-1 to 206-M may be divided according to different ranges of memory sizes. For instance, a first resource bin 206-1 may define a range between 0 and 8 GB, a second resource bin 206-2 may define a range between 8.1 and 16 GB, a third resource bin 206-3 may define a range between 16.1 and 24 GB, etc. In one regard, the processor 202 may use a relatively small number of resource bins, e.g., 4 resource bins, 8 resource bins, or the like.

Thus, for example, for the first resource setting level, the processor 202 may assign the executed workloads 126 to some or all of the resource bins 206-1 to 206-M depending upon the determined resource usage characteristic levels of the executed workloads 126. In this regard, the resource bins 206-1 to 206-M may have different distributions of executed workloads 126 with respect to each other. In one regard, the probability that an executed workload 126 will be assigned to each of the resource bins 206-1 to 206-M may be based on the distributions, e.g., the larger the number of executed workloads 126 in a resource bin, the higher the probability that an executed workload 126 will be assigned to that resource bin.

The processor 202 may fetch, decode, and execute the instructions 216 to determine, for each of the resource bins 206-1 to 206-M, an average execution time of the executed workloads in the resource bin 206-1 to 206-M. Thus, for instance, the processor 202 may sum the execution times of the executed workloads 126 assigned to a first resource bin 206-1 and divide that summed value with the total number of executed workloads 126 assigned to the first resource bin 206-1. The processor 202 may determine the average execution times of the executed workloads 126 assigned to the remaining resource bins 206-2 to 206-M in a similar manner.

The processor 202 may fetch, decode, and execute the instructions 218 to determine a total average execution time of the executed workloads 126 corresponding to the first resource setting level from the average execution times of the executed workloads 126 assigned to the resource bins 206-1 to 206-M. That is, for instance, the processor 202 may determine the total average execution time of the executed workloads 126 corresponding to the first resource setting level by summing the average execution times of the executed workloads 126 assigned to the resource bins 206-1 to 206-M by the total number of resource bins 206-1 to 206-M. The total average execution time corresponding to the first resource setting level may be a baseline lowest total average execution time and may be used as a basis for determining an actual resource setting level.

The processor 202 may instruct the database controller 114 to set the resource setting 116 to a second resource setting level and may repeat the instructions 212-218 to determine a total average execution time of the executed workloads 126 corresponding to the second resource level. The processor 202 may also instruct the database controller 114 to set the resource setting 116 to a third resource setting level and may repeat the instructions 212-218 to determine a total average execution time of the executed workloads 126 corresponding to the third resource level. The processor 202 may repeat this process for a predetermined number of resource setting levels, for a predetermined length of time, until a certain condition is reached, and/or the like. By way of example, the certain condition may be met when an executed workload 126 is assigned to the resource bin 206-M that defines the highest range of resource usage characteristics. In addition or in other examples, the certain condition may be met when at least one query is found in each of the resource bins 206-1 to 206-M. In any regard, the processor 202 may use the same set of workloads 126 and/or workloads 126 of the same types in each of the iterations of the instructions 212-218.

In any regard, after multiple iterations of the instructions 212-218 under different resource setting levels, the processor 202 may determine a plurality of total average execution times of the executed workloads 126 corresponding to the different resource setting levels. The processor 202 may fetch, decode, and execute the instructions 220 to identify, from the determined plurality of total average execution times, a lowest total average execution time. In addition, the processor 202 may fetch, decode, and execute the instructions 222 to determine the resource setting level of a plurality of resource setting levels that corresponds to the identified lowest total average execution time. Moreover, the processor 202 may fetch, decode, and execute the instructions 224 to apply the determined resource setting level, for instance, in the execution of another (e.g., future, additional, etc.) workload. By way of example, the processor 202 may instruct the database controller 114 to tune the resource setting 116 to the determined resource setting level.

Instead of the machine readable instructions 212-224, the apparatus 200 may include hardware logic blocks that may perform functions similar to the instructions 212-224. In other examples, the apparatus 200 may include a combination of instructions and hardware logic blocks to implement or execute functions corresponding to the instructions 212-224. In any of these examples, the processor 202 may implement the hardware logic blocks and/or execute the instructions 212-224. As discussed herein, the apparatus 200 may also include additional instructions and/or hardware logic blocks such that the processor 202 may execute operations in addition to or in place of those discussed above with respect to FIG. 2.

Figure 3:
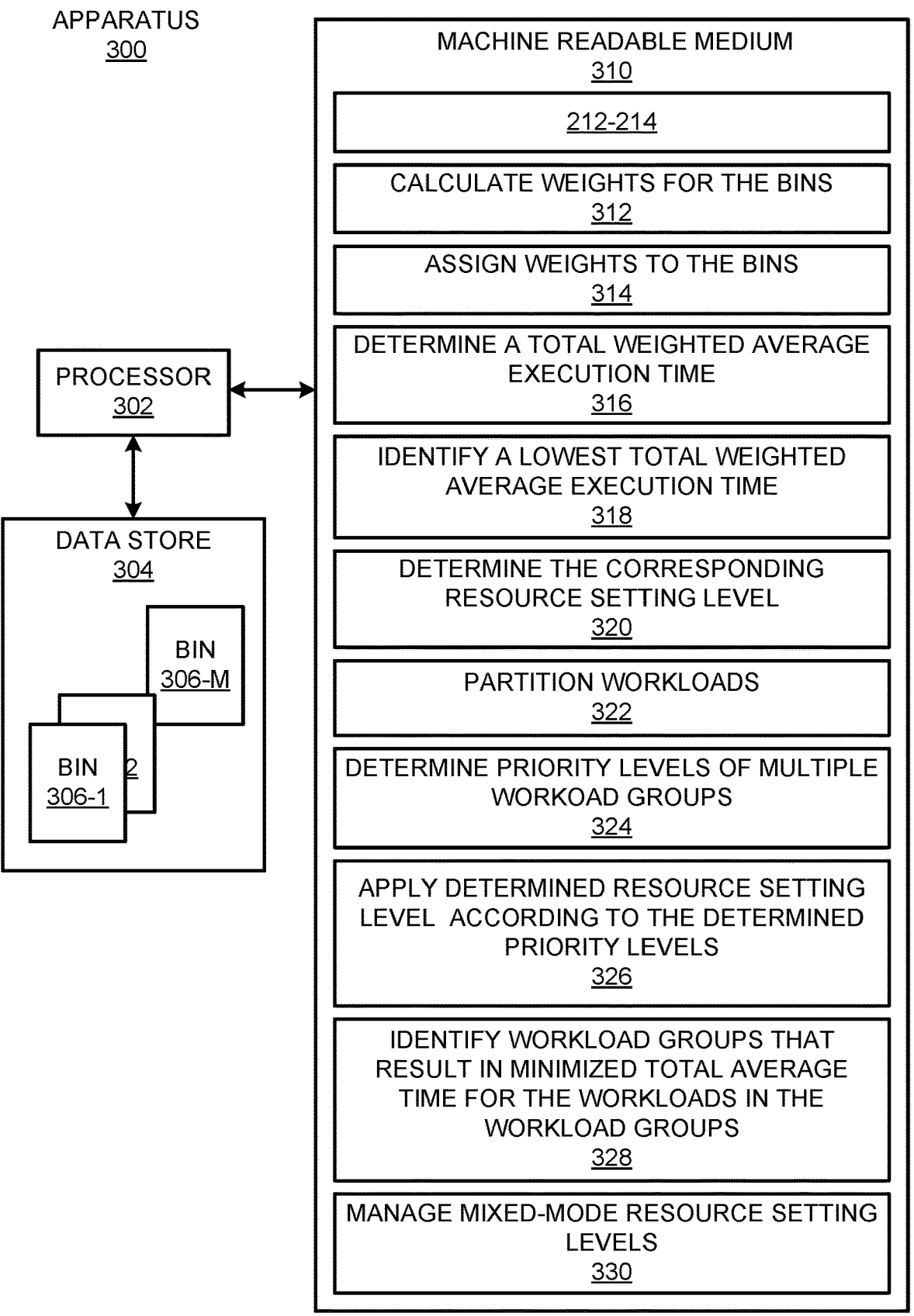
FIG. 3 depicts a block diagram of an apparatus that may tune resource setting levels applicable to the execution of workloads in accordance with another embodiment of the present disclosure.

With reference now to FIG. 3, there is shown a block diagram of an apparatus 300 that may tune resource setting levels applicable to the execution of workloads in accordance with another embodiment of the present invention. It should be understood that the apparatus 300 depicted in FIG. 3 may include additional features and that some of the features described herein may be removed and/or modified without departing from the scope of the apparatus 300.

Generally speaking, the apparatus 300 may be equivalent to the apparatus 112 depicted in FIG. 1 and the apparatus 200 depicted in FIG. 2. The description of the apparatus 300 is thus made with reference to the features depicted in FIGS. 1 and 2. As shown, the apparatus 300 may include a processor 302 and a machine readable medium 310. The processor 302 may be equivalent to the processor 202 and the machine readable medium 310 may be equivalent to the machine readable medium 210. Although the apparatus 300 is depicted as having a single processor 302, it should be understood that the apparatus 300 may include additional processors and/or cores without departing from a scope of the apparatus 300. In this regard, references to a single processor 302 as well as to a single machine readable medium 310 may be understood to additionally or alternatively pertain to multiple processors 302 and multiple machine readable mediums 310. In any regard, the machine readable medium 310 may have stored thereon machine readable instructions 212-214 and 312-330.

The processor 302 may fetch, decode, and execute the instructions 212 and 214 as discussed above with respect to FIG. 2. In addition, the processor 302 may fetch, decode, and execute the instructions 312 to calculate weights for the resource bins 306-1 to 306-M, which may be equivalent to the resource bins 206-1 to 206-M depicted in FIG. 2. According to examples, the weights for the resource bins 306-1 to 306-M may be based on the probabilities of the workloads 126 being assigned to (e.g., occurring in) the bins 306-1 to 306-M. The probabilities may be determined, for instance, from the distributions of the executed workloads 126 in the resource bins 306-1 to 306-M. Thus, for instance, a larger weight may be calculated for a resource bin 306-1 to which a larger number of executed workloads 126 have been assigned than a resource bin 306-2 to which a smaller number of executed workloads 126 have been assigned.

The processor 302 may fetch, decode, and execute the instructions 314 to assign the calculated weights to the resource bins 306-1 to 306-M, e.g., multiply the calculated weights with the average execution times of the executed workloads 126 in the respective resource bins 306-1 to 306-M. In addition, the processor 302 may fetch, decode, and execute the instructions 316 to determine a total weighted average execution time. For instance, the processor 302 may sum the weighted average execution times of the executed workloads 126 to determine the total weighted average execution time corresponding to a certain resource setting level 116.

The processor 302 may repeat the instructions 212-214 and 312-316 with the resource setting 116 respectively set at multiple different resource setting levels to determine the total weighted average execution times corresponding to the different resource setting levels. In addition, the processor 302 may repeat this process for a predetermined number of resource setting levels, for a predetermined length of time, until a certain condition is reached, and/or the like. By way of example, the certain condition may be met when an executed workload 126 is assigned to the resource bin 306-M that defines the highest range of resource usage characteristics. In addition or in other examples, the certain condition may be met when at least one query is found in each of the resource bins 306-1 to 306-M. In any regard, the processor 302 may use the same set of workloads 126 and/or workloads 126 of the same types in each of the iterations of the instructions 212-214 and 312-316.

In any regard, after multiple iterations of the instructions 212-214 and 312-316 under different resource setting levels, the processor 302 may determine a plurality of total weighted average execution times of the executed workloads 126 corresponding to the different resource setting levels. In addition, the processor 302 may fetch, decode, and execute the instructions 318 to identify, from the determined plurality of total weighted average execution times, a lowest total weighted average execution time. Moreover, the processor 302 may fetch, decode, and execute the instructions 320 to determine the resource setting level corresponding to the identified lowest total weighted average execution time. The processor 302 may further apply the determined resource setting level, for instance, in the execution of additional (e.g., future) workloads. By way of example, the processor 302 may instruct the database controller 114 to set the resource setting 116 to the determined resource setting level.

The processor 302 may fetch, decode, and execute the instructions 322 to partition the workloads 126 into multiple workload groups. The processor 302 may partition the workloads 126 in any of a number of manners. For instance, the processor 302 may partition the workloads 126 into groups according to the types of the workloads 126, the requestors of the workloads 126, the sizes of the workloads 126, and/or the like. In addition, the processor 302 may determine the total average execution times (which may instead be the total weighted average execution times) of each of the multiple workload groups for each of the plurality of resource setting levels. The processor 302 may further identify, for each of the multiple workload groups, a lowest total average execution time of the determined total average execution times. In addition, the processor 302 may determine, for each of the multiple workload groups, a respective resource setting level of the plurality of resource setting levels corresponding to the identified lowest total average execution time.

The processor 302 may thus determine a first resource setting level corresponding to a lowest total average execution time for a first workload group, a second resource setting level corresponding to a lowest total average execution time for a second workload group, and so forth. In some instances, the resource setting levels may not be equivalent to each other. In these instances, the processor 302 may select one of the resource setting levels to be applied in the execution of additional workloads. For instance, the processor 302 may fetch, decode, and execute the instructions 324 to determine priority levels of the workloads 126 in the multiple workload groups. The priority levels may be user-defined and/or the processor 302 may determine the priority levels based on the types of the workloads 126, the criticalities of the workloads 126, and/or the like.

In addition, the processor 302 may fetch, decode, and execute the instructions 326 to apply the determined resource setting level in the execution of additional workloads in the multiple workload groups according to the determined priority levels. That is, for instance, the processor 302 may apply the determined resource setting level corresponding to the workload group having the highest priority level.

The processor 302 may fetch, decode, and execute the instructions 328 to identify workload groups including the workloads 126 that may result in a minimized total average time for the execution of the workloads 126 in the workload groups. In other words, the processor 302 may determine an optimal partitioning of the workloads 126 into the workload groups such that the amount of time consumed in the execution of the workloads 126 in a first workload group may be minimized through application of a particular resource setting level. Likewise, the processor 302 may determine the optimal partitioning of the workloads 126 into the workload groups such that the amount of time consumed in the execution of the workloads 126 in a second workload group may be minimized through application of another particular resource setting level.

The processor 302 may identify the workload groups from the determined total average execution times of the executed workloads 126. The processor 302 may also identify the workload groups from a past history of the execution times of the workloads, analysis of similar workload characteristics, and/or the like. In any regard, the processor 302 may identify the optimized workload groups to enable the workloads 126 to be executed in a shortest amount of time.

The processor 302 may fetch, decode, and execute the instructions 330 to manage mixed-mode resource setting levels. The workloads 126 may be deemed to have been executed under mixed-mode resource setting levels in instances in which the workloads 126 were executed under more than one resource setting level as may occur during a change in the resource setting level between iterations in determining the lowest total average execution time. For instance, a mixed-mode execution may have occurred where multiple queries are executing with different resource limits. For example, one query may be executing with a 25% memory limit along with another query that is concurrently executing with a 10% memory limit. Mixed-mode executions may be due to changes in setting levels due to the sampling process but may not occur in steady-state execution with fixed resource setting levels (e.g., pure-mode executions). Mixed-mode may be a transient phase and may cease once the currently executing queries have completed execution as new queries that arrive will have identical settings.

According to examples, instead of discarding all of the execution time measurements from the mixed-mode execution and thereby losing those measurements, the processor 302 may do the following. For instance, the processor 302 may discard the execution time measurements for workloads 126 having wait times for resource grants with incompatible resource limits in mixed-mode. As another example, the processor 302 may keep the execution time measurements for workloads 126 in instances in which the workloads 126 executed concurrently, including interference, in mixed-mode that are immediately granted resources (e.g., with a small or no wait time). In this regard, for instance, the processor 302 may discard execution time measurements from a query only if the query is waiting for resource grants and the query's resource limits are not compatible with those of already executing queries.

Figure 4:
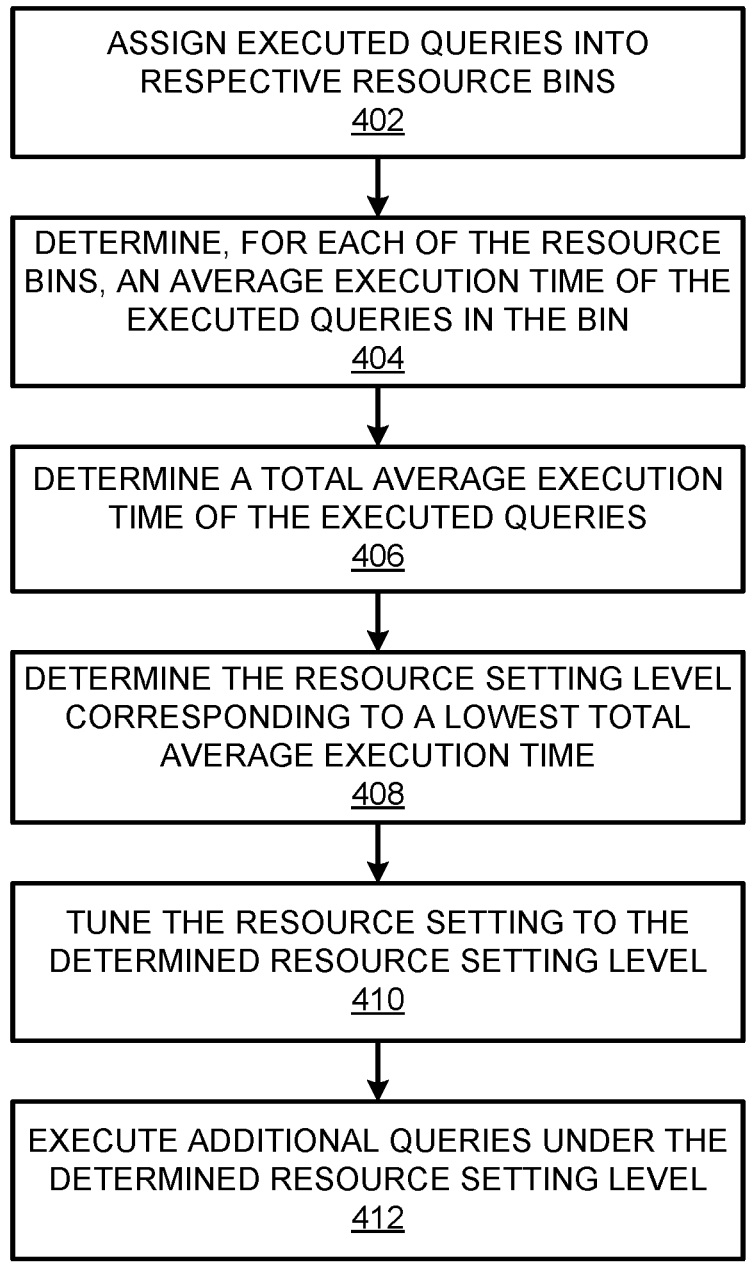
FIGS. 4 and 5, respectively, depict flow diagrams of methods for tuning resource setting levels applicable to the execution of queries in accordance with embodiments of the present invention.
Figure 5:
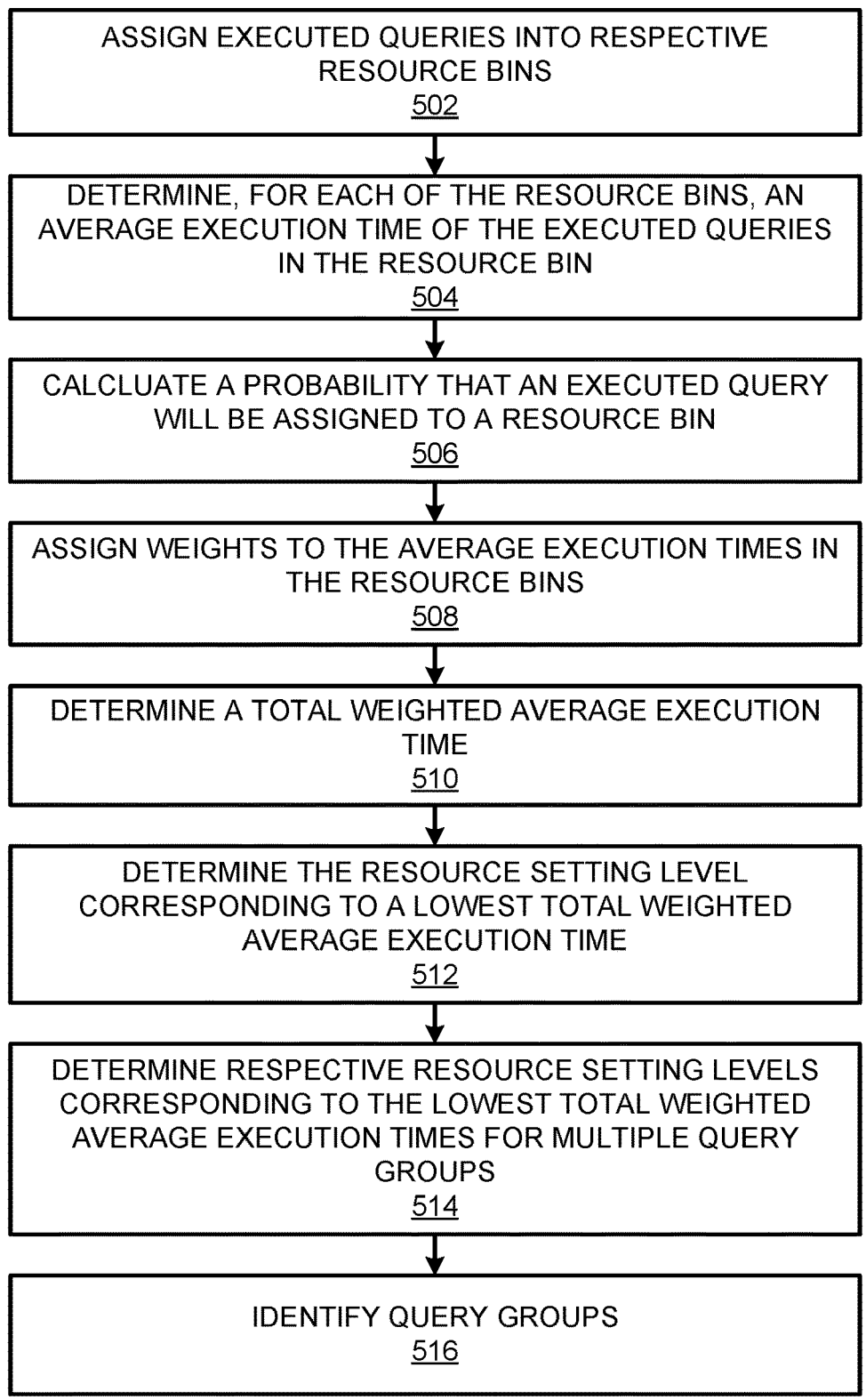

Various manners in which the processors 202, 302 of the apparatuses 200, 300 may operate are discussed in greater detail with respect to the methods 400 and 500 depicted in FIGS. 4 and 5. Particularly, FIGS. 4 and 5, respectively, depict flow diagrams of methods 400 and 500 for tuning resource setting levels applicable to the execution of queries in accordance with embodiments of the present disclosure. It should be understood that the methods 400 and 500 depicted in FIGS. 4 and 5 may include additional operations and that some of the operations described therein may be removed and/or modified without departing from the scopes of the methods 400 and 500. The descriptions of the methods 400 and 500 are made with reference to the features depicted in FIGS. 1-3 for purposes of illustration.

With reference first to FIG. 4, at block 402, the processor 202, 302 may assign executed queries 126 into respective resource bins 306-1 to 306-M based on determined resource usage characteristics of the executed queries 126 resulting from a first resource setting level. As discussed herein, each of the resource bins 306-1 to 306-M may define a different range of resource usage characteristics.

At block 404, the processor 202, 302 may determine, for each of the resource bins 306-1 to 306-M, an average execution time of the executed queries 126 in the resource bin 306-1 to 306-M. In addition, at block 406, the processor 202, 302 may determine a total average execution time of the executed queries from the determined average execution times. In other examples, the processor 202, 302 may determine a total weighted average execution time of the executed queries from the determined weighted average execution times.

The processor 202, 302 may repeat blocks 402-406 for a number of iterations under different resource setting levels to determine a plurality of respective total average execution times of the executed workloads 126 corresponding to the different resource setting levels. For instance, the processor 202, 302 may repeat this process for a predetermined number of resource setting levels, for a predetermined length of time, until a certain condition is reached, and/or the like. In other examples, the processor 202, 302 may determine a plurality of total weighted average execution times.

At block 408, the processor 202, 302 may determine the resource setting level corresponding to a lowest total average execution time of the determined total average execution times. Alternatively, the processor 202, 302 may determine the resource setting level corresponding to a lowest total weighted average execution time of the determined total average execution times.

At block 410, the processor 202, 302 may tune the resource setting 116 to the determined resource setting level. For instance, the processor 202, 302 may instruct the database controller 114 to tune the resource setting 116. In addition, at block 412, the processor 202, 302 may cause the database controller 114 to execute additional queries under the determined resource setting level.

Turning now to FIG. 5, at block 502, the processor 202, 302 may assign executed queries 126 into respective resource bins 306-1 to 306-M based on determined resource usage characteristics of the executed queries 126 resulting from a first resource setting level. In addition, at block 504, the processor 202, 302 may determine, for each of the resource bins 306-1 to 306-M, an average execution time of the executed queries 126 in the resource bin 306-1 to 306-M.

At block 506, the processor 202, 302 may calculate a probability that an executed query 126 will be assigned to a resource bin 306-1 to 306-M. As discussed herein, the probability may be based on the distribution of the executed queries 126 in the respective resource bins 306-1 to 306-M. At block 508, the processor 202, 302 may assign weights to the average execution times of the queries 126 in the resource bins 306-1 to 306-M. The weights may be based on the calculated probabilities such that, for instance, the higher probabilities may correspond to higher weights. In addition, at block 510, the processor 202, 302 may determine a total weighted average execution time from the weighted average execution times.

The processor 202, 302 may repeat blocks 502-510 for a number of iterations under different resource setting levels to determine a plurality of total average execution times of the executed workloads 126 corresponding to the different resource setting levels. For instance, the processor 202, 302 may repeat this process for a predetermined number of resource setting levels, for a predetermined length of time, until a certain condition is reached, and/or the like. In other examples, the processor 202, 302 may determine a plurality of total weighted average execution times.

At block 512, the processor 202, 302 may determine the resource setting level corresponding to a lowest total weighted average execution time of the determined total weighted average execution times.

At block 514, the processor 202, 302 may determine respective resource setting levels corresponding to the lowest total weighted execution times for multiple query groups. That is, for instance, the processor 202, 302 may partition the queries 126 into multiple query groups, determine total weighted average execution times of each of the multiple query groups for each of the plurality of resource setting levels. The processor 202, 302 may also identify, for each of the multiple query groups, a lowest total weighted average execution time of the determined total average execution times and determine, for each of the multiple query groups, a respective resource setting level of the plurality of resource setting levels corresponding to the identified lowest resource setting level.

According to examples, the processor 202, 302 may determine priority levels of the multiple query groups and may set the resource setting level in the execution of additional queries in the multiple query groups according to the determined priority levels. That is, for instance, the processor 202, 302 may set the resource setting level to the resource setting level corresponding to the query group having the highest priority level.

At block 516, the processor 202, 302 may identify, from the determined total average execution times of the executed queries 126, a plurality of query groups, in which a respective resource setting level is to minimize the total weighted average execution time for the queries in each of the query groups. That is, for instance, the processor 202, 302 may identify query groups for which particular resource setting levels may result in minimized total weighted average execution times for the queries in the query groups. Thus, for instance, the processor 202, 302 may instruct or cause queries 126 to be executed in respective query groups with the resource setting set to the determined resource setting level for that query group.

Some or all of the operations set forth in the methods 400 and 500 may be included as utilities, programs, or subprograms, in any desired computer accessible medium. In addition, the methods 400 and 500 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
   a processor; and
   a machine readable medium on which is stored machine readable instructions that are to cause the processor to:
   for each of a plurality of resource setting levels,
   determine resource usage characteristics and execution times of executed workloads;
   assign, based on the resource usage characteristics of the executed workloads, each of the executed workloads into one of a plurality of resource bins, wherein each of the plurality of resource bins defines a different range of resource usage characteristics;

determine, for each of the resource bins, an average execution time of the executed workloads in the resource bin; and determine a total average execution time of the executed workloads from the determined average execution times;

identify a lowest total average execution time of the determined total average execution times;

determine the resource setting level of the plurality of resource setting levels corresponding to the identified lowest total average execution time; and tune a resource setting to the determined resource setting level.

2. The apparatus of claim 1, wherein the resource usage characteristics comprise ideal memory sizes for execution of the workloads and wherein the plurality of resource bins are divided according to different ranges of memory sizes.

3. The apparatus of claim 1, wherein the plurality of resource setting levels comprise at least one of degree of parallelism, maximum memory, or cost threshold for parallelism.

4. The apparatus of claim 1, wherein the instructions are further to cause the processor to:

apply weights to the average execution times of executed workloads assigned to the resource bins, wherein the weights applied to the resource bins are based on probabilities of occurrence of the executed workloads in the resource bins.

5. The apparatus of claim 1, wherein the instructions are further to cause the processor to:

apply the determined resource setting level in the execution of additional workloads.

6. The apparatus of claim 1, wherein the instructions are further to cause the processor to:

partition the workloads into multiple workload groups, determine total average execution times of each of the multiple workload groups for each of the plurality of resource setting levels;

identify, for each of the multiple workload groups, a lowest total average execution time of the determined total average execution times; and determine, for each of the multiple workload groups, a respective resource setting level of the plurality of resource setting levels corresponding to the identified lowest total average execution time.

7. The apparatus of claim 6, wherein the instructions are further to cause the processor to:

determine priority levels of the multiple workload groups; and apply the determined resource setting level in the execution of additional workloads in the multiple workload groups according to the determined priority levels.

8. The apparatus of claim 1, wherein the instructions are further to cause the processor to:

identify, from the determined total average execution times of the executed workloads, a plurality of workload groups, wherein a respective resource setting level is to minimize the total average execution time for the workloads in each of the workload groups.

9. The apparatus of claim 1, wherein the instructions are further to cause the processor to:

determine whether the workloads were executed under mixed-modes of resource setting levels;

determine whether the mixed-modes of resource setting levels are compatible with each other; and based on a determination that one of the resource setting levels is incompatible with another one of the resource setting levels, discard workloads executed under an incompatible resource setting level from the assignment of the executed workloads into the plurality of resource bins.

10. A method comprising:

at each resource setting level of a plurality of resource setting levels, assigning, by the processor, executed queries into respective resource bins based on determined resource usage characteristics of the executed queries, each of the resource bins defining a different range of resource usage characteristics;

determining, by the processor and for each of the resource bins, an average execution time of the executed queries in the resource bin; and determining, by the processor, a total average execution time of the executed queries from the determined average execution times;

determining, by the processor, the resource setting level corresponding to a lowest total average execution time of the determined total average execution times; and tuning, by the processor, a resource setting to the determined resource setting level.

11. The method of claim 10, further comprising:

calculating, for each of the resource bins, a probability that an executed query will be assigned to the resource bin;

assigning a respective weight to the average execution time of the executed queries in a resource bin based on the calculated probability for the bin; and wherein determining the total average execution time further comprises determining the total average execution time as a weighted sum of the determined average execution times.

12. The method of claim 10, wherein the resource usage characteristics comprise ideal memory sizes for execution of the queries, wherein the bins are divided according to different ranges of memory sizes, and wherein the plurality of resource setting levels comprise at least one of a maximum degree of parallelism pertaining a number of parallel threads used to execute a query, maximum memory that a query is permitted, or cost threshold for parallelism.

13. The method of claim 10, further comprising:

determining a baseline lowest total average execution time; and wherein determining the resource setting level corresponding to the lowest average execution time further comprises determining the resource setting level using the baseline lowest total average execution time.

14. The method of claim 10, further comprising:

executing additional queries under the tuned resource setting level.

15. The method of claim 10, further comprising:

partitioning the queries into multiple query groups, determining total average execution times of each of the multiple query groups for each of the plurality of resource setting levels;

identifying, for each of the multiple query groups, a lowest total average execution time of the determined total average execution times; and determining, for each of the multiple query groups, a respective resource setting level of the plurality of resource setting levels corresponding to the identified lowest resource setting level.

16. The method of claim 15, further comprising:

determining priority levels of the multiple query groups; and setting the resource setting level in the execution of additional queries in the multiple query groups according to the determined priority levels.

17. The method of claim 10, further comprising:
identifying, from the determined total average execution times of the executed queries, a plurality of query groups, wherein a respective resource setting level is to minimize the total weighted average execution time for the queries in each of the query groups.

18. A non-transitory machine readable medium on which is stored machine readable instructions that when executed by a processor, cause the processor to:
determine resource usage characteristics and execution times of executed workloads under multiple resource setting levels;
assign, for each of the multiple resource setting levels, the executed workloads into one of a plurality of bins based on the resource usage characteristics of the executed workloads, each of the bins defining a different range of resource usage characteristics;
determine, for each of the multiple resource setting levels for each of the bins, an average execution time of the executed workloads in the bin; and
determine, for each of the multiple resource setting levels, a total average execution time of the executed workloads from the determined average execution times;
identify a lowest total average execution time of the determined total average execution times;
determine a resource setting level of the plurality of resource setting levels corresponding to the identified lowest total average execution time; and
tune a resource setting to the determined resource setting level corresponding to the identified lowest total average execution time.

19. The machine readable medium of claim 18, wherein the instructions are further to cause the processor to:
calculate, for each of the bins, a probability that an executed workload will be assigned to the bin;
assign a respective weight to the average execution time of the executed workloads in a bin based on the calculated probability for the bin; and
wherein to determine the total average execution time, determine the total average execution time as a weighted sum of the determined average execution times.

20. The machine readable medium of claim 18, wherein the instructions are further to cause the processor to:
partition the workloads into multiple workload groups,
determine total average execution times of each of the multiple workload groups for each of the plurality of resource setting levels;
identify, for each of the multiple workload groups, a lowest total average execution time of the determined total average execution times; and
determine, for each of the multiple workload groups, a respective resource setting level of the plurality of resource setting levels corresponding to the identified lowest resource setting level.

* * * * *